(12) United States Patent
Zhang et al.

(10) Patent No.: US 11,855,423 B2
(45) Date of Patent: Dec. 26, 2023

(54) APPARATUS FOR DISMOUNTING AND MOUNTING HIGH-VOLTAGE LINE T-CONNECTOR IN HOT-LINE OPERATION

(71) Applicant: CHENGDU UNIVERSITY OF INFORMATION TECHNOLOGY, Chengdu (CN)

(72) Inventors: Gexiang Zhang, Chengdu (CN); Qiang Yang, Chengdu (CN); Ming Zhu, Chengdu (CN); Jun Liu, Chengdu (CN); Xiaozhao Jin, Chengdu (CN); Jiawei Wang, Chengdu (CN); Dapeng Zhang, Chengdu (CN); Zhenyu Wang, Chengdu (CN); Li Yang, Chengdu (CN); Minyao Tan, Chengdu (CN); Qiang Yang, Chengdu (CN); Qiyu Liu, Chengdu (CN); Qin Qin, Chengdu (CN)

(73) Assignee: CHENGDU UNIVERSITY OF INFORMATION TECHNOLOGY, Chengdu (CN)

( * ) Notice: Subject to any disclaimer, the term of this patent is extended or adjusted under 35 U.S.C. 154(b) by 0 days.

(21) Appl. No.: 17/919,546

(22) PCT Filed: Jun. 5, 2020

(86) PCT No.: PCT/CN2020/094541
§ 371 (c)(1),
(2) Date: Oct. 18, 2022

(87) PCT Pub. No.: WO2020/233727
PCT Pub. Date: Nov. 26, 2020

(65) Prior Publication Data
US 2023/0142724 A1 May 11, 2023

(30) Foreign Application Priority Data

May 17, 2019 (CN) .......................... 201910409803.5
May 17, 2019 (CN) .......................... 201910412950.8

(51) Int. Cl.
*H02G 1/04* (2006.01)
*H02G 1/14* (2006.01)

(52) U.S. Cl.
CPC .................. *H02G 1/04* (2013.01); *H02G 1/14* (2013.01)

(58) Field of Classification Search
CPC ......... B66F 11/00; B66F 11/04; B66F 11/042; B66F 11/02; B25J 5/007; B25J 5/06;
(Continued)

(56) References Cited

U.S. PATENT DOCUMENTS 5,215,202 A * 6/1993 Fujimoto ................. H02G 1/04
212/232
5,286,159 A * 2/1994 Honma ................. B66F 11/046
182/2.11
(Continued)

FOREIGN PATENT DOCUMENTS

CN     203932812 U    11/2014
CN     106584440 A     4/2017
(Continued)

*Primary Examiner* — Tyrone V Hall, Jr.
(74) *Attorney, Agent, or Firm* — Bayramoglu Law Offices LLC

(57) ABSTRACT

An apparatus for dismounting and mounting a high-voltage line T-connector in a hot-line operation includes a lifting platform, a four-axis platform and an end-effector mechanism; the four-axis platform and the end-effector mechanism are both electrically conductive structures; the four-axis platform is fixedly mounted on the top of the lifting platform, and an insulating layer is provided between the four-axis platform and the lifting platform; the four-axis
(Continued)

platform is movable in the X direction, the Y direction, and the Z direction, and is rotatable around the Z direction; the four-axis platform is provided with an equipotential mechanism; the end-effector mechanism is detachably fastened to the four-axis platform; and a bolt loosening/tightening mechanism or a nut cutting device capable of moving in the X direction, the Y direction, and the Z direction is provided on the end-effector mechanism.

7 Claims, 8 Drawing Sheets

(58) Field of Classification Search
CPC .. H02G 1/00; H02G 1/02; H02G 1/04; H02G 1/14; H02G 7/00; H02G 7/02
See application file for complete search history.

(56) References Cited

U.S. PATENT DOCUMENTS

| | | | |
|---|---|---|---|
| 6,325,749 B1 * | 12/2001 | Inokuchi | H02G 1/02 |
| | | | 182/2.11 |
| 2015/0204480 A1 * | 7/2015 | Lorimer | F16M 13/02 |
| | | | 248/323 |
| 2016/0111860 A1 * | 4/2016 | Liu | B25J 5/00 |
| | | | 29/745 |

FOREIGN PATENT DOCUMENTS

| | | |
|---|---|---|
| CN | 108247599 A | 7/2018 |
| CN | 207753424 U | 8/2018 |
| CN | 109648303 A | 4/2019 |
| CN | 110112675 A | 8/2019 |
| CN | 110165603 A | 8/2019 |
| KR | 20150077600 A | 7/2015 |

* cited by examiner

APPARATUS FOR DISMOUNTING AND MOUNTING HIGH-VOLTAGE LINE T-CONNECTOR IN HOT-LINE OPERATION

CROSS REFERENCE TO THE RELATED APPLICATIONS

This application is the national phase entry of International Application No. PCT/CN2020/094541, filed on Jun. 5, 2020, which is based upon and claims priority to Chinese Patent Applications No. 201910412950.8 and No. 201910409803.5, both filed on May 17, 2019, the entire contents of which are incorporated herein by reference.

TECHNICAL FIELD

The present invention belongs to the field of electric power maintenance engineering devices, and in particular relates to an apparatus for dismounting and mounting a high-voltage line T-connector in a hot-line operation.

BACKGROUND

The high-voltage lines of the transformer substation are densely distributed with high-voltage line T-connectors, and the function thereof is to divert the high-voltage lines to various cities and towns. However, high-voltage line T-connectors are exposed outdoors for many years, and are susceptible to the weather and the environment. For example, snow and wind will cause high voltage lines to generate vibration, so that a bolt on a connection plate is loosened to generate an electric spark, thereby causing line breakage accidents; and the bolt on the connection plate may also suffer serious corrosion under a severe environment, forming an adhesion with the connection plate, and thereby easily causing accidents. Therefore, the looseness or corrosion of high-voltage line T-connector bolts is not only a potential hidden danger affecting the safe and stable operation of the power grid, but also the main source of causing a huge economic loss to the power breaker region.

In case of looseness or corrosion of high-voltage line T-connector bolts, the bolts shall be replaced in time so as to avoid accidents. If the current at the high-voltage bus end is cut off when replacing the bolts, the power supply region of the bus will be cut off, causing an incalculable economic loss to production and life. Therefore, at present, an equipotential is manually established between the high altitude and the high-voltage bus, and then connection plate bolts are mounted and dismounted to complete replacement. In this method, a hot-line operation is performed on a high-voltage line T-connector in an equipotential state, and the operation will be limited by the distance of hot-line operation, causing it difficult for an operator to perform an action, thus causing that the tightening torque of bolts fail to reach the national standards, and even causing the case that a wrench sleeve cannot cover the bolt. In addition, manual equipotential hot-line operations must be performed with the approval of a dispatching department, and an approval process thereof is relatively complex, causing that bolts which are loose or corroded are difficult to be replaced in time, and increasing the risk of accidents.

SUMMARY

A first objective of the present invention is to provide an apparatus for dismounting a high-voltage line T-connector in a hot-line operation, so as to achieve the safe dismounting of the high-voltage line T-connector in a hot-line operation instead of a direct manual operation.

In order to achieve the above objective, the present invention adopts the following technical solutions:

An apparatus for dismounting a high-voltage line T-connector in a hot-line operation, comprising a lifting platform, a four-axis platform and an end-effector mechanism, wherein the four-axis platform and the end-effector mechanism are both electrically conductive structures;

the four-axis platform is fixedly mounted on the top of the lifting platform, an insulating layer is provided between the four-axis platform and the lifting platform; the four-axis platform is movable in the X direction, the Y direction, and the Z direction, and is rotatable around the Z direction; and the four-axis platform is provided with an equipotential mechanism capable of establishing an equipotential relationship with a high-voltage bus;

the end-effector mechanism is detachably fastened to the four-axis platform; the end-effector mechanism comprises an inverted "L"-shaped integrated frame, and damping wheels capable of traveling on the high-voltage bus is connected to the top wall of the integrated frame; a guide rail moving mechanism is movable in the X direction, the Y direction, and the Z direction is connected to the side wall of the integrated frame; a nut cutting device used for breaking a nut is connected to the guide rail moving mechanism; and a sub-line connection plate gripper used for clamping a branch line is provided on the bottom of the side wall of the integrated frame.

According to the described solution, the four-axis platform comprises first X-direction guide rail mechanisms, a first Y-direction guide rail mechanism, a first Z-direction guide rail mechanism and a first slewing mechanism; the first X-direction guide rail mechanisms and the first Y-direction guide rail mechanism are both horizontally arranged; the first X-direction guide rail mechanisms are fixedly mounted on the top of the lifting platform, and an insulating layer is arranged between the first X-direction guide rail mechanisms and the lifting platform; the first Y-direction guide rail mechanism is fixedly mounted on the top of the first X-direction guide rail mechanisms and is arranged perpendicular to the first X-direction guide rail mechanisms; the first Z-direction guide rail mechanism is vertically arranged and is arranged perpendicular to both the first X-direction guide rail mechanisms and the first Y-direction guide rail mechanism; the bottom of the first Z-direction guide rail mechanism is connected to the top of the first Y-direction guide rail mechanism by means of the first slewing mechanism; the equipotential mechanism is fixedly connected to the first Z-direction guide rail mechanism; and a hook used for fastening the end-effector mechanism is provided on the first Z-direction guide rail mechanism.

Further, the first X-direction guide rail mechanisms, the first Y-direction guide rail mechanism and the first Z-direction guide rail mechanism have the same structure, and all comprise a base plate, linear guide rails, a mounting plate, a lead screw, a motor and a speed reducer; the base plate and the mounting plate are arranged in parallel relative to each other; the lead screw is located on the central line in the length direction of the base plate; the two linear guide rails are respectively provided at two sides of the lead screw and are arranged in parallel to the lead screw; one end of the lead screw is connected to the motor and the speed reducer in a fitting manner; slide blocks are respectively provided at two ends of the mounting plate and are capable of freely sliding in the linear guide rails; and an internal thread is provided on the middle portion of the mounting plate and is connected to the lead screw in a fitting manner;

the base plate of each first X-direction guide rail mechanism is fixedly mounted on the top of the lifting platform, and an insulating layer is provided between the base plate and the lifting platform; the base plate of the first Y-direction guide rail mechanism is fixedly connected to the mounting plate of each first X-direction guide rail mechanism; the mounting plate of the first Y-direction guide rail mechanism is connected to the lower end of the base plate of the first Z-direction guide rail mechanism by means of the first slewing mechanism; the equipotential mechanism is fixed on the base plate of the first Z-direction guide rail mechanism; and the hook is fixedly connected to the mounting plate of the first Z-direction guide rail mechanism.

Further, the equipotential mechanism comprises a transverse rod arranged horizontally, an inclined rod arranged obliquely and having a variable length, a pneumatic push rod arranged vertically, and a clamping claw mounted on the top of the pneumatic push rod; one end of the transverse rod, the upper end of the inclined rod, and the lower end of the pneumatic push rod are hinged together; and the other end of the transverse rod and the lower end of the inclined rod are respectively hinged to the base plate of the first Z-direction guide rail mechanism.

According to the described solution, the guide rail moving mechanism comprises a second X-direction guide rail mechanism, a second Y-direction guide rail mechanism and a second Z-direction guide rail mechanism;

the second X-direction guide rail mechanism, the second Y-direction guide rail mechanism and the second Z-direction guide rail mechanism have the same structure, and all comprise a base plate, linear guide rails, a mounting plate, a lead screw, a motor and a speed reducer; the base plate and the mounting plate are arranged in parallel relative to each other; the lead screw is located on the central line in the length direction of the base plate; the two linear guide rails are respectively provided at two sides of the lead screw and are arranged in parallel to the lead screw; one end of the lead screw is connected to the motor and the speed reducer in a fitting manner; slide blocks are respectively provided at two ends of the mounting plate and are capable of freely sliding in the linear guide rails; and an internal thread is provided on the middle portion of the mounting plate and is connected to the lead screw in a fitting manner;

the base plate of the second Y-direction guide rail mechanism is fixed on the side wall of the integrated frame; the base plate of the second Z-direction guide rail mechanism is fixedly connected to the mounting plate of the second Y-direction guide rail mechanism; the mounting plate of the second Z-direction guide rail mechanism is fixedly connected to one end of the base plate of the second X-direction guide rail mechanism; and the nut cutting device is mounted on the mounting plate of the second X-direction guide rail mechanism.

According to the described solution, a second slewing mechanism is connected between the nut cutting device and the mounting plate of the second X-direction guide rail mechanism.

A second objective of the present invention is to provide an apparatus for mounting a high-voltage line T-connector in a hot-line operation, so as to achieve the safe mounting of the high-voltage line T-connector in a hot-line operation instead of a direct manual operation.

In order to achieve the above objective, the present invention adopts the following technical solutions:

An apparatus for mounting a high-voltage line T-connector in a hot-line operation, comprising a lifting platform, a four-axis platform and an end-effector mechanism, wherein the four-axis platform and the end-effector mechanism are both electrically conductive structures;

the four-axis platform is fixedly mounted on the top of the lifting platform, an insulating layer is provided between the four-axis platform and the lifting platform; the four-axis platform is movable in the X direction, the Y direction, and the Z direction, and is rotatable around the Z direction; and the four-axis platform is provided with an equipotential mechanism capable of establishing an equipotential relationship with a high-voltage bus;

the end-effector mechanism is detachably fastened to the four-axis platform; the end-effector mechanism comprises an inverted "L"-shaped integrated frame, and damping wheels capable of traveling on the high-voltage bus is connected to the top wall of the integrated frame; a left-direction guide rail mechanism and a right-direction guide rail mechanism are respectively provided on the left and right sides of the side wall of the integrated frame, and the left-direction guide rail mechanism and the right-direction guide rail mechanism are movable in the X direction, the Y direction, and the Z direction; an electric wrench used for loosening or tightening a nut is connected to the left-direction guide rail mechanism, and a bolt fixing plate is connected to the right-direction guide rail mechanism; and a sub-line connection plate gripper used for clamping a branch line is provided on the bottom of the side wall of the integrated frame.

According to the described solution, the four-axis platform comprises first X-direction guide rail mechanisms, a first Y-direction guide rail mechanism, a first Z-direction guide rail mechanism and a first slewing mechanism; the first X-direction guide rail mechanisms and the first Y-direction guide rail mechanism are both horizontally arranged; the first X-direction guide rail mechanisms are fixedly mounted on the top of the lifting platform, and an insulating layer is arranged between the first X-direction guide rail mechanisms and the lifting platform; the first Y-direction guide rail mechanism is fixedly mounted on the top of the first X-direction guide rail mechanisms and is arranged perpendicular to the first X-direction guide rail mechanisms; the first Z-direction guide rail mechanism is vertically arranged and is arranged perpendicular to both the first X-direction guide rail mechanisms and the first Y-direction guide rail mechanism; the bottom of the first Z-direction guide rail mechanism is connected to the top of the first Y-direction guide rail mechanism by means of the first slewing mechanism; the equipotential mechanism is fixedly connected to the first Z-direction guide rail mechanism; and a hook used for fastening the end-effector mechanism is provided on the first Z-direction guide rail mechanism.

Further, the first X-direction guide rail mechanisms, the first Y-direction guide rail mechanism and the first Z-direction guide rail mechanism have the same structure, and all comprise a base plate, linear guide rails, a mounting plate, a lead screw, a motor and a speed reducer; the base plate and the mounting plate are arranged in parallel relative to each other; the lead screw is located on the central line in the length direction of the base plate; the two linear guide rails are respectively provided at two sides of the lead screw and are arranged in parallel to the lead screw; one end of the lead screw is connected to the motor and the speed reducer in a fitting manner; slide blocks are respectively provided at two ends of the mounting plate and are capable of freely sliding in the linear guide rails; and an internal thread is provided on the middle portion of the mounting plate and is connected to the lead screw in a fitting manner;

the base plate of each first X-direction guide rail mechanism is fixedly mounted on the top of the lifting platform, and an insulating layer is provided between the base plate and the lifting platform; the base plate of the first Y-direction guide rail mechanism is fixedly connected to the mounting plate of each first X-direction guide rail mechanism; the mounting plate of the first Y-direction guide rail mechanism is connected to the lower end of the base plate of the first Z-direction guide rail mechanism by means of the first slewing mechanism; the equipotential mechanism is fixed on the base plate of the first Z-direction guide rail mechanism; and the hook is fixedly connected to the mounting plate of the first Z-direction guide rail mechanism.

Further, the equipotential mechanism comprises a transverse rod arranged horizontally, an inclined rod arranged obliquely and having a variable length, a pneumatic push rod arranged vertically, and a clamping claw mounted on the top of the pneumatic push rod; one end of the transverse rod, the upper end of the inclined rod, and the lower end of the pneumatic push rod are hinged together; and the other end of the transverse rod and the lower end of the inclined rod are respectively hinged to the base plate of the first Z-direction guide rail mechanism.

According to the described solution, the left-direction guide rail mechanism comprises a second X-direction guide rail mechanism, a second Y-direction guide rail mechanism and a second Z-direction guide rail mechanism; and the right-direction guide rail mechanism comprises a third X-direction guide rail mechanism, a third Y-direction guide rail mechanism and a third Z-direction guide rail mechanism;

the second X-direction guide rail mechanism, the second Y-direction guide rail mechanism, the second Z-direction guide rail mechanism, the third X-direction guide rail mechanism, the third Y-direction guide rail mechanism, and the third Z-direction guide rail mechanism have the same structure, and all comprise a base plate, linear guide rails, a mounting plate, a lead screw, a motor and a speed reducer; the base plate and the mounting plate are arranged in parallel relative to each other; the lead screw is located on the central line in the length direction of the base plate; the two linear guide rails are respectively provided at two sides of the lead screw and are arranged in parallel to the lead screw; one end of the lead screw is connected to the motor and the speed reducer in a fitting manner; slide blocks are respectively provided at two ends of the mounting plate and are capable of freely sliding in the linear guide rails; and an internal thread is provided on the middle portion of the mounting plate and is connected to the lead screw in a fitting manner;

the base plate of the second Y-direction guide rail mechanism is fixed on the side wall of the integrated frame; the base plate of the second Z-direction guide rail mechanism is fixedly connected to the mounting plate of the second Y-direction guide rail mechanism; the mounting plate of the second Z-direction guide rail mechanism is fixedly connected to one end of the base plate of the second X-direction guide rail mechanism; and the electric wrench is mounted on the mounting plate of the second X-direction guide rail mechanism;

the base plate of the third Y-direction guide rail mechanism is fixed on the side wall of the integrated frame; the base plate of the third Z-direction guide rail mechanism is fixedly connected to the mounting plate of the third Y-direction guide rail mechanism; the mounting plate of the third Z-direction guide rail mechanism is fixedly connected to one end of the base plate of the third X-direction guide rail mechanism; and the bolt fixing plate is mounted on the mounting plate of the third X-direction guide rail mechanism.

Further, a second slewing mechanism is connected between the bolt fixing plate and the mounting plate of the third X-direction guide rail mechanism.

According to the described solution, a nut box used for placing a nut is further provided on the side wall of the integrated frame.

Compared with the prior art, the present invention has the following beneficial effects:
(1) The present invention replaces a manual hot-line operation manner by means of a mechanical mechanism, reduces the operation risk and improves the operation efficiency, so that an operator can be away from a high-altitude and dangerous operation environment, thereby preventing accidents such as electric shock and high-altitude falls from occurring; and high-voltage line T-connectors can be dismounted or mounted under hot-line conditions by means of an end-effector mechanism, thereby avoiding the negative effects of power failure and improving power supply reliability.
(2) In the operation of the present invention, the end-effector mechanism is suspended on the high-voltage overhead line, avoiding the shaking generated by the lifting platform; by means of the combined operation mode of the lifting platform, the four-axis platform and the end-effector mechanism, different parts can be replaced at any time according to different targets of the operation, the overall structure is simple, and the stability is good.
(3) In the present invention, a slewing mechanism is provided on an end-effector mechanism, when a T-connector is dismounted, a nut cutting device can be rotated to adapt same to any angle of a screw hole on a bus connection plate, and when the T-connector is mounted, a bolt fixing plate can be rotated to adapt same to any angle of the screw hole on the bus connection plate.

DETAILED DESCRIPTION OF THE EMBODIMENTS

Figure 1:
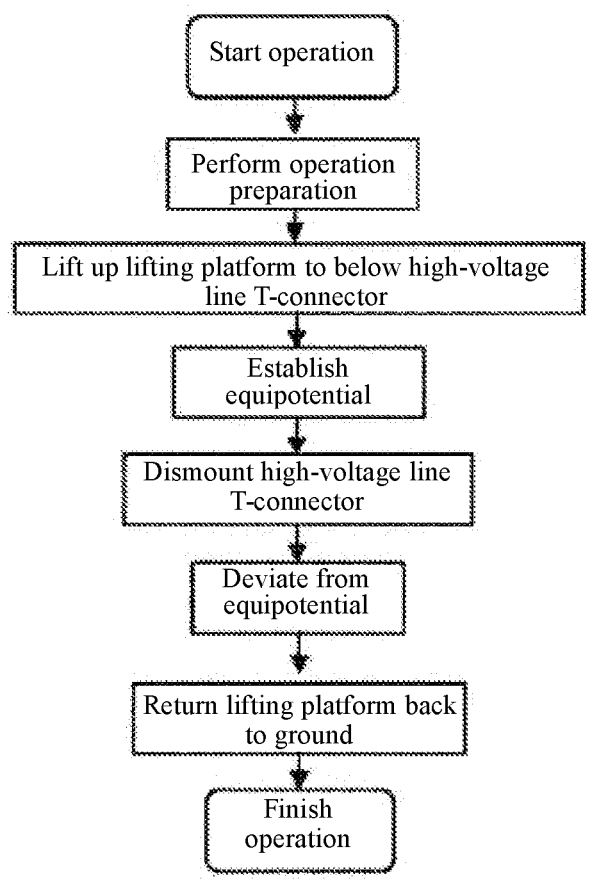
FIG. 1 is a diagram illustrating an operation flow of the present invention when dismounting the high-voltage line T-connector.

The specific embodiments of the present invention will be further described in conjunction with the accompanying drawings. In the drawings, the reference signs are as follows: a lifting platform 1, a four-axis platform 2, a first X-direction guide rail mechanism 21, a first Y-direction guide rail mechanism 22, a first slewing mechanism 23, a first Z-direction guide rail mechanism 24, a hook 25, an equipotential mechanism 26, a transverse rod 261, an inclined rod 262, a pneumatic push rod 263, a clamping jaw 264, a base plate 211, a linear guide rail 212, a mounting plate 213, a lead screw 214, a motor and a speed reducer 215, an end-effector mechanism 3, an integrated frame 31, a damping wheel 32, a second X-direction guide rail mechanism 33, a second Y-direction guide rail mechanism 34, a second Z-direction guide rail mechanism 35, a nut cutting device 36, a second slewing mechanism 37, a sub-line connection plate gripper 38, a third X-direction guide rail mechanism 39, a third Y-direction guide rail mechanism 310, a third Z-direction guide rail mechanism 311, an electric wrench 312, a nut box 313, a bolt fixing plate 314, a high-voltage bus 41, a branch line 42, a high-voltage line T-connector 5, a bus connection plate 51, and a sub-line connection plate 52.

To describe the technical solutions and technical objectives of the present invention, the following further describes the present invention with reference to the accompanying drawings and specific embodiments.

Embodiment 1

Figure 3:
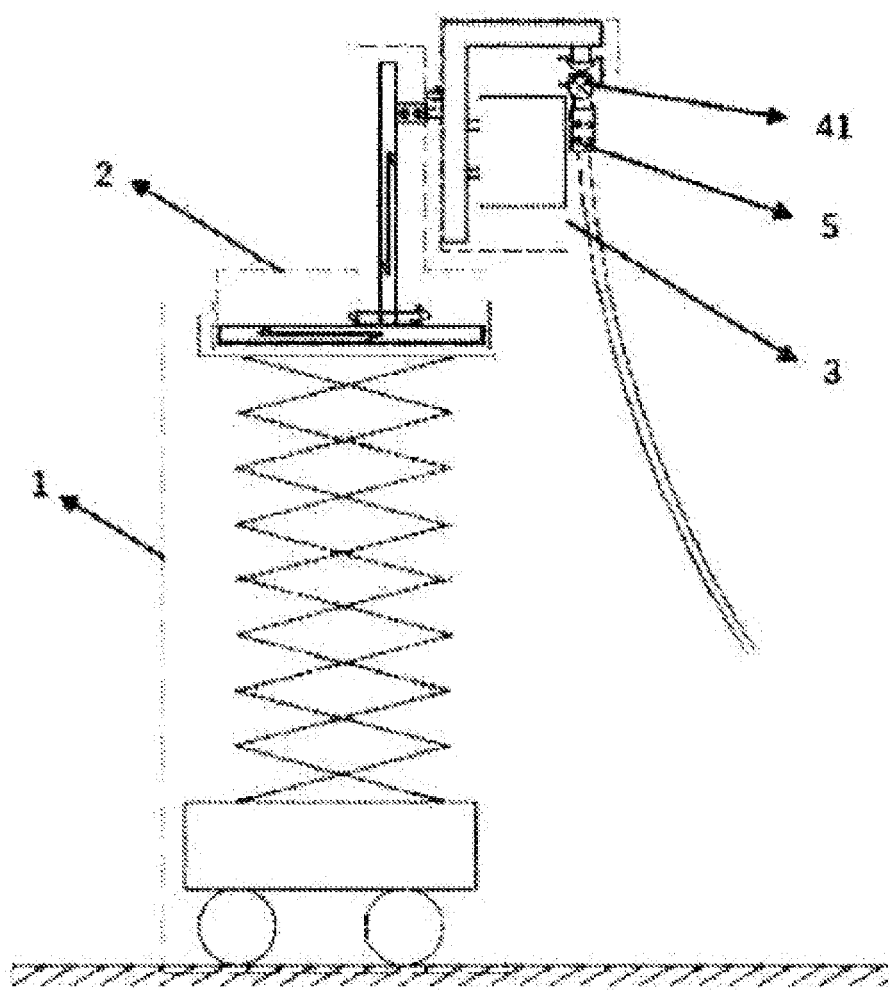
FIG. 3 is an overall structural diagram of the present invention.

As shown in FIG. 3, the apparatus for dismounting a high-voltage line T-connector in a hot-line operation of the present embodiment comprises a lifting platform 1, a four-axis platform 2 and an end-effector mechanism 3.

The lifting platform 1 can meet the lifting requirement by means of a common lifting platform such as a QYCY type mobile lifting platform of the Taiwan HOULAR brand.

The four-axis platform 2 is fixed on the upper surface of the lifting platform 1 by means of bolts. The end-effector mechanism 3 is hung on the four-axis platform 2 by means of a hook 25.

Figure 8:
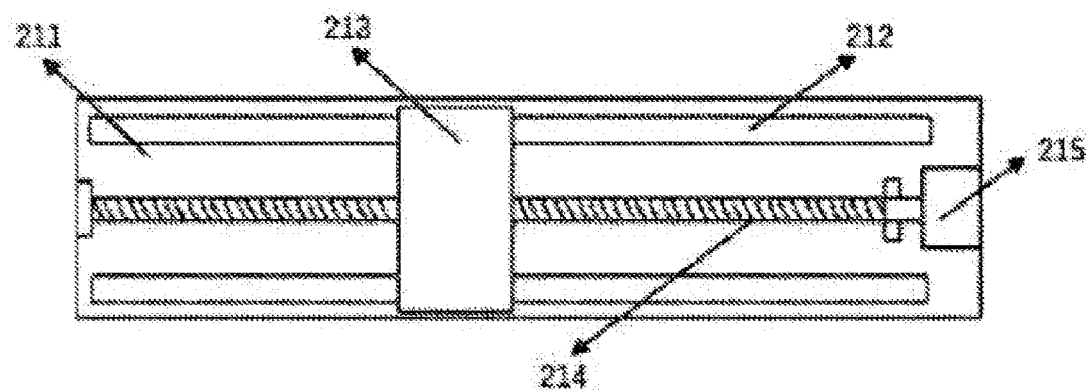
FIG. 8 is a structural diagram of guide rail mechanisms of the present invention.

As shown in FIG. 8, the motion relationships in the four-axis platform 2 and the end-effector mechanism 3 are mostly composed of guide rail mechanisms, and the guide rail mechanisms have the same structure, are composed of a base plate 211, linear guide rails 212, a mounting plate 213, a lead screw 214, a motor and a speed reducer 215, and can form a linear motion pair with other components by means of the mounting of the mounting plate 213.

Figure 4:
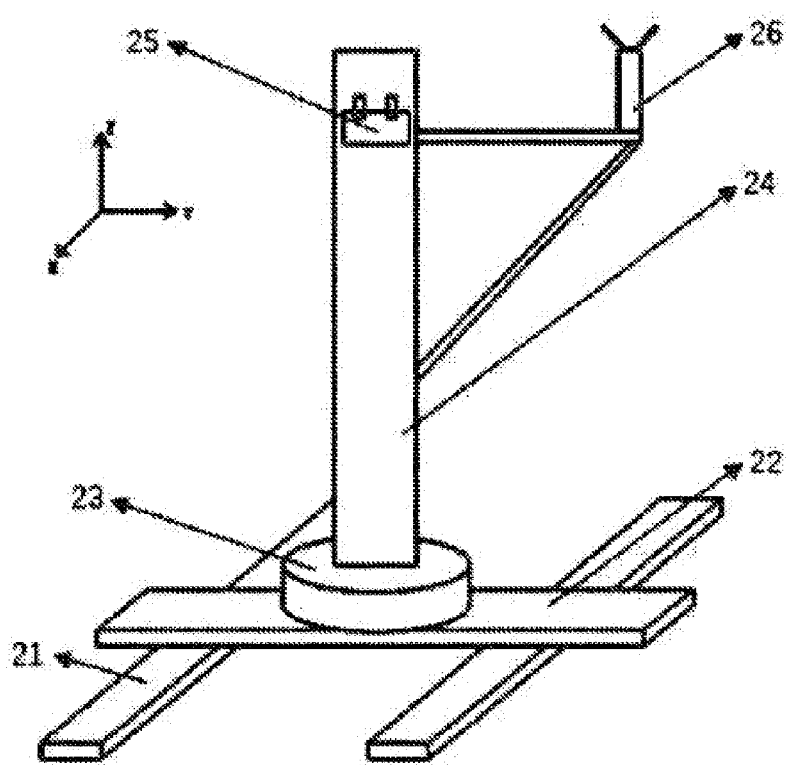
FIG. 4 is a structural diagram of a four-axis platform of the present invention.

As shown in FIG. 4, the four-axis platform 2 is mainly composed of first X-direction guide rail mechanisms 21, a first Y-direction guide rail mechanism 22, a first Z-direction guide rail mechanism 24, a first slewing mechanism 23, an equipotential mechanism 26 and a hook 25. The first Y-direction guide rail mechanism 22 is connected to and mounted on the two first X-direction guide rail mechanisms 21 which are parallel to each other by means of bolts. The first slewing mechanism 23 is connected and fixed to the first Y-direction guide rail mechanism 22 by means of bolts. The first Z-direction guide rail mechanism 24 is connected and fixed to the first slewing mechanism 23 by means of bolts. The hook 25 is fixed to the first Z-direction guide rail mechanism 24 by means of welding. The equipotential mechanism 26 is connected and fixed to the side surface of the first Z-direction guide rail mechanism 24 by means of bolts.

Figure 5:
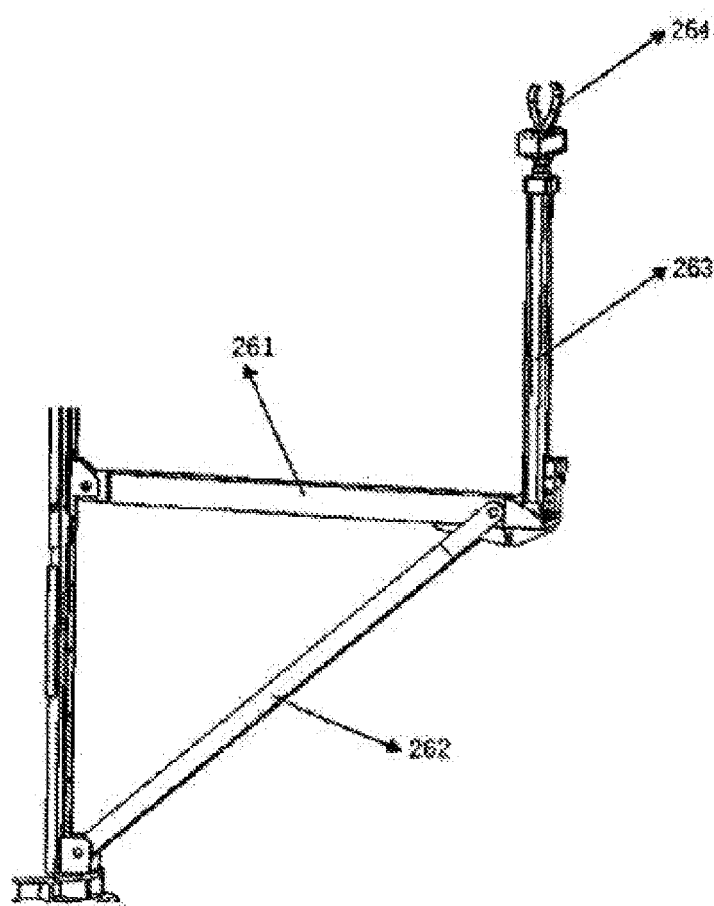
FIG. 5 is a structural diagram of an equipotential mechanism of the present invention.

As shown in FIG. 5, the equipotential mechanism 26 comprises a transverse rod 261, an inclined rod 262 having a variable length, a pneumatic push rod 263 and a clamping jaw 264, and the equipotential mechanism 26 can achieve the upward and downward adjustment by a certain distance so as to clamp the high-voltage bus 41.

Figure 6:
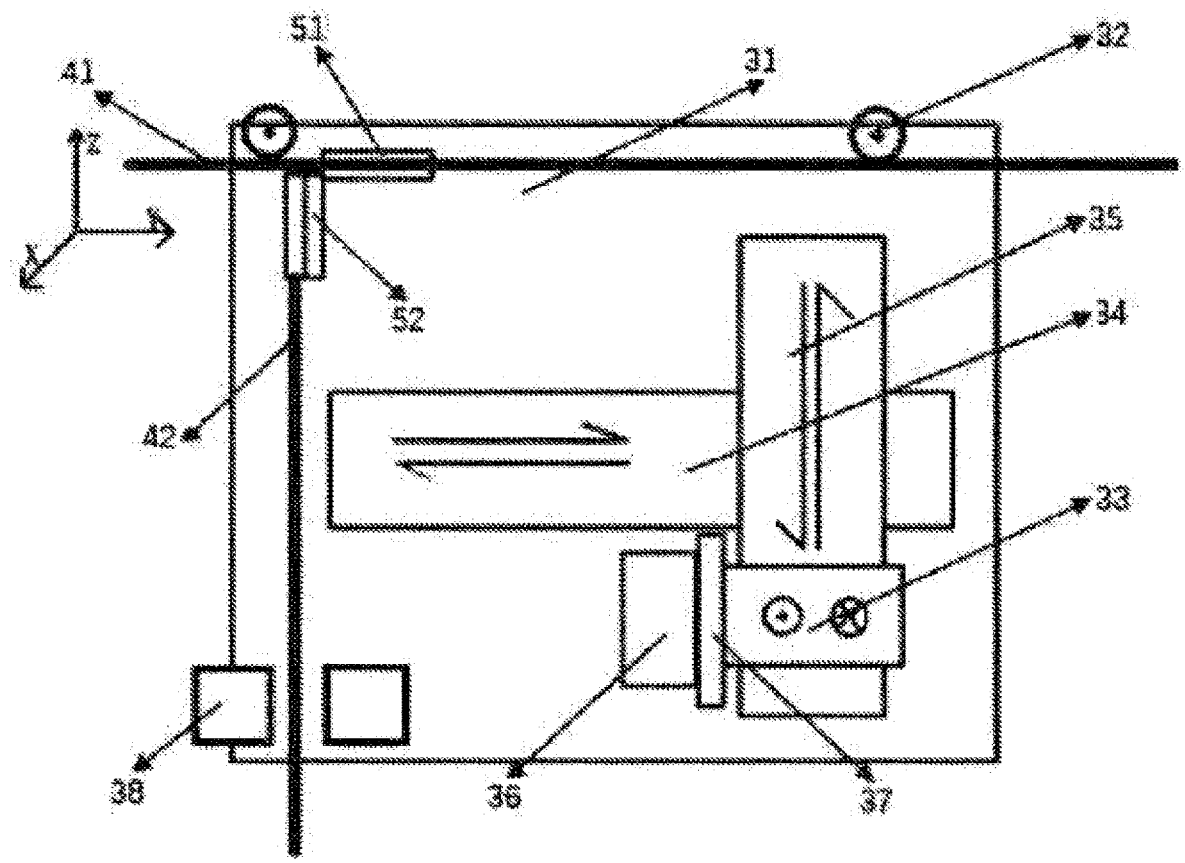
FIG. 6 is a structural diagram of an end-effector mechanism used during dismounting in the present invention.

As shown in FIG. 6, the end-effector mechanism 3 is mainly composed of an integrated frame 31, damping wheels 32, a guide rail moving mechanism, a nut cutting device 36, a second slewing mechanism 37 and a sub-line connection plate gripper 38.

The guide rail moving mechanism comprises a second X-direction guide rail mechanism 33, a second Y-direction guide rail mechanism 34 and a second Z-direction guide rail mechanism 35.

The second Y-direction guide rail mechanism 34 and the sub-line connection plate gripper 38 are connected to and mounted on the integrated frame 31 by means of bolts. The second Z-direction rail mechanism 35 is connected to and mounted on the mounting plate of the second Y-direction guide rail mechanism 34 by means of bolts. The second X-direction rail mechanism 33 is connected to and mounted on the mounting plate of the second Z-direction guide rail mechanism 35 by means of bolts. The second slewing mechanism 37 is connected to and mounted on the mounting plate of the third X-direction guide rail mechanism 33 by means of bolts. The nut cutting device 36 is connected to and mounted on the second slewing mechanism 37 by means of bolts.

The nut cutting device 36 can be a HHQ-1924 split-type nut cutting device to meet the requirements of the present embodiment.

The sub-line gripper 38 comprises two grippers driven by a geared motor, and the two grippers can be closed or separated under the drive of the reduction motor so as to clamp or loosen the sub-line connection plate 52. The geared motor is fixed on the side wall of the integrated frame 31, and a through hole for two grippers to pass through is provided on the side wall of the integrated frame 31.

The first slewing mechanism 23 and the second slewing mechanism 37 both comprise a motor and a slewing reducer, and can achieve unlimited circumferential slewing and speed reduction.

Figure 9:
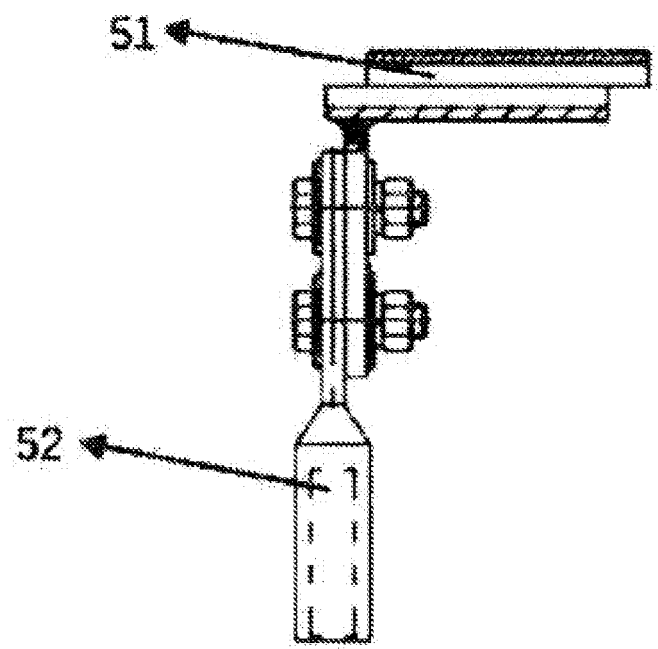
FIG. 9 is a structural diagram of a high-voltage line T-connector of the present invention.
Figure 10:
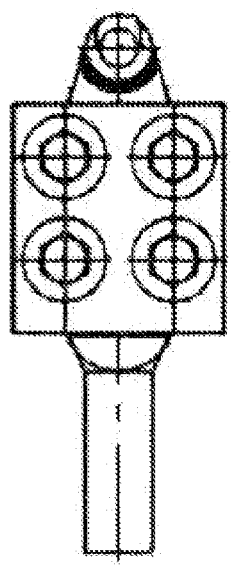
FIG. 10 is the left view structural diagram of FIG. 9.

As shown in FIG. 1, the operation manner of the present embodiment is as follows:

The high-voltage line T-connector 5 comprises a bus connection plate 51 connected to the high-voltage bus 41 and a sub-line connection plate 52 connected to the branch line 42, as shown in FIGS. 9 and 10. The lifting platform 1 lifts up the four-axis platform 2 and the end-effector mechanism 3 to be below the high-voltage bus 41. The four-axis platform 2 aligns an equipotential mechanism 26 mounted at an end part thereof with the high-voltage bus 41, and the equipotential mechanism 26 immediately establishes an equipotential relationship with the high-voltage bus 41. The four-axis platform 2 hangs the end-effector mechanism 3 mounted at the end thereof on the high-voltage bus 41, and then the end-effector mechanism 3 is separated from the hook 25 of the four-axis platform 2.

The end-effector mechanism 3 is hung on the high-voltage bus 41 by means of the damping wheels 32, and grips the sub-line connection plate 52 connected to the branch line 42 by means of the sub-line connection plate gripper 38, then uses the second X-direction guide rail mechanism 33, the second Y-direction guide rail mechanism 34, the second Z-direction guide rail mechanism 35 and the second slewing mechanism 37 on the end-effector mechanism 3 to align bolts, and uses the nut cutting device 36 at the end of the second slewing mechanism 37 to break and dismount the nut. After the nut is broken and dismounted, the four-axis platform 2 hooks the end-effector mechanism 3 again, the equipotential mechanism 26 is separated from the high-voltage bus 41, the lifting platform 1 brings the four-axis platform 2 and the end-effector mechanism 3 back to the ground.

The following steps are specifically comprised:
1. An operator performs operation preparation of an apparatus for dismounting a high-voltage line T-connector in a hot-line operation described in the present embodiment, checks meteorological conditions, checks pole numbers, arranges sites, and checks and tests tools;
   1.1 checking meteorological conditions, ambient environment, line apparatuses and security measures;
   1.2 arranging sites: setting security guard rails, operation signs, and related warning signs on the work site;
   1.3 checking and debugging the entire device to ensure that there is no error.
2. moving the lifting platform 1 to a position in the vicinity of the high-voltage line T-connector 5 to be operated.
3. dismounting the high-voltage line T-connector;
   3.1 hanging, by an operator, the end-effector mechanism 3 on the four-axis platform 2 by means of a hook 25 on the ground;
   3.2 operating the lifting platform 1 to lift up the four-axis platform 2 and the end-effector mechanism 3 to a certain height;
   3.3 then, by means of the upward movement of the first X-direction guide rail mechanisms 21 and the first Y-direction guide rail mechanism 22 on the four-axis platform 2, the damping wheels 32 of the end-effector mechanism 3 is lifted up to the vicinity of the high-voltage bus 41;
   3.4 rotating the first slewing mechanism 23 so that the integrated frame 31 of the end-effector mechanism 3 is parallel to the high-voltage bus 41;
   3.5 then, by means of the movement of the first X-direction guide rail mechanisms 21 and the first Y-direction guide rail mechanism 22 on a plane, the damping wheels 32 of the end-effector mechanism 3 is moved to a position right above the high-voltage bus 41;
   3.6 the first Z-direction guide rail mechanism 24 moves downwards, and the end-effector mechanism 3 is hung on a high-voltage bus 41 by means of damping wheels 32;
   3.7 the sub-line connection plate gripper 38 clamps the part of the high-voltage branch line 42, and the end-effector mechanism 3 is integrated with the high-voltage line;
   3.8 moving the second X-direction guide rail mechanism 33 and the second Z-direction guide rail mechanism 35 to align the nut cutting device 36 with the nut;
   3.9 then rotating the second slewing mechanism 37 to align the nut cutting device 36 with the nut of the target bolt;
   3.10 moving the second Y-direction guide rail mechanism 34 to fasten the nut cutting device 36 into the nut of the target bolt;
   3.11 then driving the nut cutting device 36 to break the nut of the target bolt;
   3.12 then moving the second Y-direction guide rail mechanism 34 to withdraw the nut cutting device 36;
   3.13 sequentially completing the described steps 3.8-3.12 to destroy the nuts of all the bolts on the high-voltage line T-connector 5, and keeping the sub-line connection plate gripper 38 always gripping the part of the high-voltage branch line 42.
4. The four-axis platform 2 hooks the end-effector mechanism 3 by means of the hook 25 in reverse operation, and the sub-line connection plate grippers 38 of the end-effector mechanism 3 return to the vicinity of the ground together with the high-voltage branch line 42.

In the present embodiment, a control cabinet, a communication module, and a power supply battery can also be provided on the lifting platform 1, and a camera capable of collecting an operation scenario image is mounted on the end-effector mechanism 3, so as to remotely control the lifting platform 1, the four-axis mechanism 2, and the end-effector mechanism 3 to complete operation. The control cabinet, the communication module and the camera are provided, so that an operator can be away from a high-altitude and dangerous work environment, thereby preventing accidents such as electric shock and high-altitude falls from occurring; the intelligence, security and timeliness of a hot-line operation can be improved, thereby reducing the labor intensity of the operator, reducing the harm to a human body caused by a high-voltage strong magnetic field, and ensuring the continuity and reliability of power supply; and the automation level of the hot-line operation in the electric power industry can be effectively improved, thereby reducing the risk of the hot-line operation.

Embodiment 2

As shown in FIG. 3, an apparatus for mounting a high-voltage line T-connector in a hot-line operation of the present embodiment comprises a lifting platform 1, a four-axis platform 2 and an end-effector mechanism 3.

The lifting platform 1 can meet the lifting requirement by means of a common lifting platform such as a QYCY type mobile lifting platform of the Taiwan HOULAR brand.

The four-axis platform 2 is fixed on the upper surface of the lifting platform 1 by means of bolts. The end-effector mechanism 3 is hung on the four-axis platform 2 by means of a hook 25.

As shown in FIG. 8, the motion relationships in the four-axis platform 2 and the end-effector mechanism 3 are mostly composed of guide rail mechanisms, and the guide rail mechanisms have the same structure, are composed of a base plate 211, linear guide rails 212, a mounting plate 213, a lead screw 214, a motor and a speed reducer 215, and can form a linear motion pair with other components by means of the mounting of the mounting plate 213.

As shown in FIG. 4, the four-axis platform 2 is mainly composed of first X-direction guide rail mechanisms 21, a first Y-direction guide rail mechanism 22, a first Z-direction guide rail mechanism 24, a first slewing mechanism 23, an equipotential mechanism 26 and a hook 25. The first Y-direction guide rail mechanism 22 is connected to and mounted on the two first X-direction guide rail mechanisms 21 which are parallel to each other by means of bolts. The first slewing mechanism 23 is connected and fixed to the first Y-direction guide rail mechanism 22 by means of bolts. The first Z-direction guide rail mechanism 24 is connected and fixed to the first slewing mechanism 23 by means of bolts. The hook 25 is fixed to the first Z-direction guide rail mechanism 24 by means of welding. The equipotential mechanism 26 is connected and fixed to the side surface of the first Z-direction guide rail mechanism 24 by means of bolts.

As shown in FIG. 5, the equipotential mechanism 26 comprises a transverse rod 261, an inclined rod 262 having a variable length, a pneumatic push rod 263 and a clamping jaw 264, and the equipotential mechanism 26 can achieve the upward and downward adjustment by a certain distance so as to clamp the high-voltage bus 41.

Figure 7:
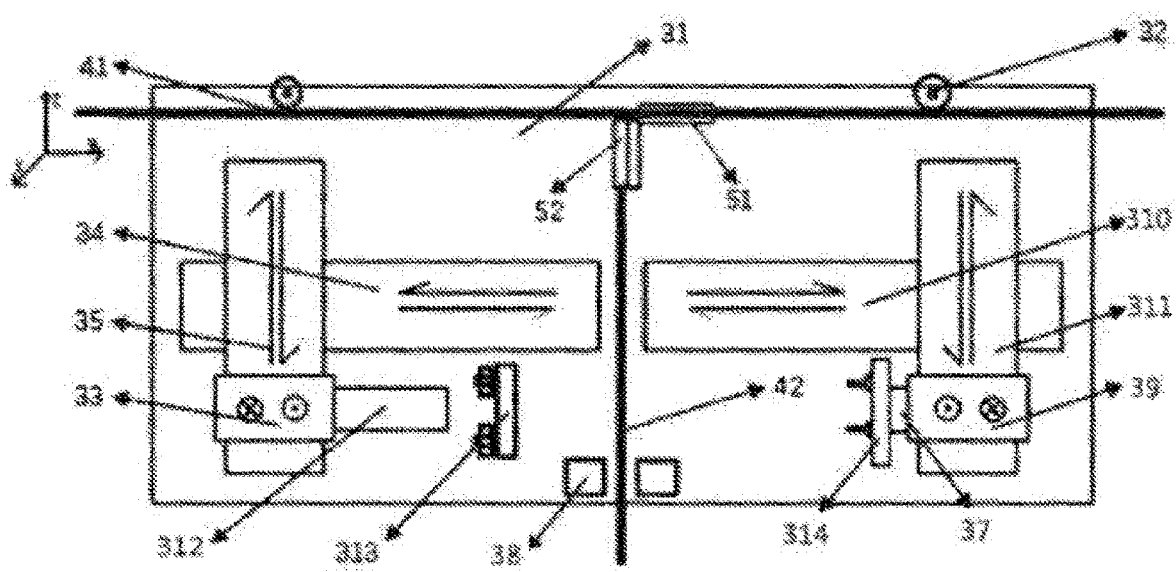
FIG. 7 is a structural diagram of an end-effector mechanism used during mounting in the present invention.

As shown in FIG. 7, the end-effector mechanism 3 is mainly composed of an integrated frame 31, damping wheels 32, a left-direction guide rail mechanism, a right-direction guide rail mechanism, a second slewing mechanism 37, an electric wrench 312, a sub-line connection plate grippers 38, a bolt fixing plate 314 and a nut box 313.

The left-direction guide rail mechanism comprises a second X-direction guide rail mechanism 33, a second Y-direction guide rail mechanism 34 and a second Z-direction guide rail mechanism 35. The right-direction guide rail mechanism comprises a third X-direction guide rail mechanism 39, a third Y-direction guide rail mechanism 310, and a third Z-direction guide rail mechanism 311.

The second Y-direction guide rail mechanism 34, the third Y-direction guide rail mechanism 310, the nut box 313, and the sub-line connection plate gripper 38 are mounted on the integrated frame 31 by means of bolts. The second Z-direction rail mechanism 35 is connected to and mounted on the mounting plate of the second Y-direction guide rail mechanism 34 by means of bolts. The third Z-direction guide rail mechanism 311 is connected to and mounted on the mounting plate of the third Y-direction guide rail mechanism 310 by means of bolts. The second X-direction rail mechanism 33 is connected to and mounted on the mounting plate of the second Z-direction guide rail mechanism 35 by means of bolts. The third X-direction guide rail mechanism 39 is connected to and mounted on the mounting plate of the third Z-direction guide rail mechanism 311 by means of bolts. The second slewing mechanism 37 is connected to and mounted on the mounting plate of the third X-direction guide rail mechanism 39 by means of bolts. The bolt fixing plate 314 is connected and fixed on the second slewing mechanism 37 by means of bolts. The electric wrench 312 is connected to and mounted on the mounting plate of the second X-direction guide rail mechanism 33 by means of bolts.

When there is more than one nuts of the high-voltage line T-connector 5, a nut box 313 needs to be provided to bear excess nuts, so as to cooperate with the electric wrench 312 to perform assembly work. The electric wrench 312 can use a P1D-600 adjustable electric wrench to meet the requirements of the present embodiment.

The sub-line gripper 38 comprises two grippers driven by a geared motor, and the two grippers can be closed or separated under the drive of the reduction motor so as to clamp or loosen the sub-line connection plate 52. Furthermore, the geared motor is fixed on the side wall of the integrated frame 31, and a through hole for two grippers to pass through is provided on the side wall of the integrated frame 31.

The first slewing mechanism 23 and the second slewing mechanism 37 both comprise a motor and a slewing reducer, and can achieve unlimited circumferential slewing and speed reduction.

Figure 2:
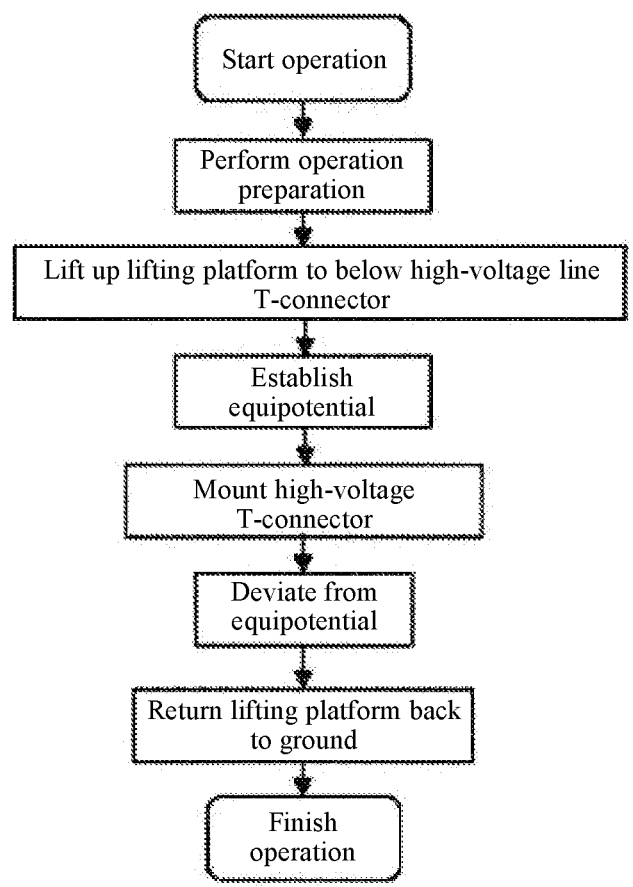
FIG. 2 is a diagram illustrating an operation flow of the present invention when mounting the high-voltage line T-connector.

As shown in FIG. 2, the operation manner of the present embodiment is as follows:

The high-voltage line T-connector 5 comprises a bus connection plate 51 connected to the high-voltage bus 41 and a sub-line connection plate 52 connected to the branch line 42, as shown in FIGS. 9 and 10. When located on the ground, the bolts are placed on the sub-line connection plate 52, and the bolts pass through the bolt fixing plate 314 on the end-effector mechanism 3, and the sub-line connection plate 52 is fixed by the sub-line connection plate gripper 38.

The lifting platform 1 lifts up the four-axis platform 2 and the end-effector mechanism 3 to be below the high-voltage bus 4. The four-axis platform 2 aligns an equipotential mechanism 26 mounted at an end part thereof with the high-voltage bus 4, and the equipotential mechanism 26 immediately establishes an equipotential relationship with the high-voltage bus 4. The four-axis platform 2 hangs the end-effector mechanism 3 mounted at the end thereof on the high-voltage bus 4, and then the end-effector mechanism 3 is separated from the hook 25 of the four-axis platform 2.

The end-effector mechanism 3 is hung on the high-voltage bus 4 by means of the damping wheels 32, aligns the sub-connection plate 52 with the bus connection plate 51 by means of the third X-direction guide rail mechanism 39, the third Y-direction guide rail mechanism 310, the third Z-direction guide rail mechanism 311 and the second rotating mechanism 37, and tightens the bolt between the sub-line connection plate 52 and the bus connection plate 51 by means of the electric wrench 312. After the bolts are tightened, the sub-line connection plate gripper 38 loosens the sub-line connection plate 52, the four-axis platform 2 hooks the end-effector mechanism 3 again by means of the hook 25, the equipotential mechanism 26 is separated from the high-voltage bus 4, the lifting platform 1 brings the four-axis platform 2 and the end-effector mechanism 3 back to the ground.

The following steps are specifically comprised:
1. An operator performs operation preparation of an apparatus for mounting a high-voltage line T-connector in a hot-line operation described in the present embodiment, checks meteorological conditions, checks pole numbers, arranges sites, and checks and tests tools;
1.1 checking meteorological conditions, ambient environment, line apparatuses and security measures;
1.2 arranging sites: setting security guard rails, operation signs, and related warning signs on the work site;
1.3 checking and debugging the entire device to ensure that there is no error.
2. moving the lifting platform 1 to a position in the vicinity of the high-voltage line T-connector 5 to be operated.
3. mounting a high-voltage line T-connector 5;
3.1 when located on the ground, the bolts are placed on the sub-line connection plate 52, and the bolts pass through the bolt fixing plate 314 on the end-effector mechanism 3, and the sub-line connection plate 52 is fixed by the sub-line connection plate gripper 38.
3.2 then, by means of the upward movement of the first Z-direction guide rail mechanism 24 above the four-axis platform 2, the damping wheels 32 of the end-effector mechanism 3 is lifted up to the vicinity of the high-voltage bus 4;
3.3 driving the first slewing mechanism 23 so that the integrated frame 31 of the end-effector mechanism 3 is parallel to the high-voltage bus 4;
3.4 then, by means of the movement of the first X-direction guide rail mechanisms 21 and the first Y-direction guide rail mechanism 22 on a plane, the damping wheels 32 of the end-effector mechanism 3 is moved to a position right above the high-voltage bus 4;
3.5 the first Z-direction guide rail mechanism 24 moves downwards, and the end-effector mechanism 3 is hung on a high-voltage bus 4 by means of damping wheels 32;
3.6 moving the third X-direction guide rail mechanism 39, the third Z-direction guide rail mechanism 311, and the second slewing mechanism 37 to align the bolt on the bolt fixing plate 314 with the connection plate bolt hole on the high-voltage bus 4;

3.7 moving the third Y-direction guide rail mechanism 310 to clamp the bolt fixing plate 314 into a connection plate bolt hole on the high-voltage bus 4;

3.8 moving the second X-direction guide rail mechanism 33 and the second Z-direction guide rail mechanism 35 to align the electric wrench 312 with the bolt;

3.9 moving the second Y-direction guide rail mechanism 34 to fasten the electric wrench 312 with a nut into the target bolt;

3.10 then driving the electric wrench 312 to mount the nut of the target bolt;

3.11 then moving the second Y-direction guide rail mechanism 34 to withdraw the electric wrench 312; moving the second X-direction guide rail mechanism 33 and the second Z-direction guide rail mechanism 35 again to align the electric wrench 312 with the nut in the nut box 313;

3.12 moving the second Y-direction guide rail mechanism 34 to make the electric lever 312 take the nut in the nut box 313;

3.13 then moving the second Y-direction guide rail mechanism 34 to withdraw the electric wrench 312;

3.14 then sequentially completing the described steps 3.8-3.13, mounting the nuts of all the bolts on the high-voltage line T-connector 5;

3.15 loosening the gripper 38 of the sub-line connection plate to disconnect the connection with the sub-line connection plate 52; and 3.15 finally, the four-axis platform 2 performs reverse operation 3.2-3.5 to hook the end-effector mechanism 3 by means of the hook 25 and then bring same back to the ground.

In the present embodiment, a control cabinet, a communication module, and a power supply battery can also be provided on the lifting platform 1, and a camera capable of collecting an operation scenario image is mounted on the end-effector mechanism 3, so as to remotely control the lifting platform 1, the four-axis mechanism 2, and the end-effector mechanism 3 to complete operation. The control cabinet, the communication module and the camera are provided, so that an operator can operate the control cabinet on the ground to complete an mounting task of high-voltage line T-connectors 5; compared with the insulating glove operation method, an operator can be away from a high-altitude and dangerous work environment, thereby preventing accidents such as electric shock and high-altitude falls from occurring; the intelligence, security and timeliness of a hot-line operation can be improved, thereby reducing the labor intensity of the operator, reducing the harm to a human body caused by a high-voltage strong magnetic field, and ensuring the continuity and reliability of power supply; and the automation level of the hot-line operation in the electric power industry can be effectively improved, thereby reducing the risk of the hot-line operation.

In the description of the present invention, it should be noted that, orientation or position relationships indicated by terms such as "up", "down", "front", "back", "left" and "right" are orientation or position relationships based on the accompanying drawings, which are only used to facilitate the description of the present invention and simplify the description, rather than indicating or implying that limitations or elements of the present invention must have specific orientations, and must be constructed and operated in specific orientations, and therefore cannot be understood as limitations to the present invention.

What is claimed is:

1. An apparatus for mounting a high-voltage line T-connector in a hot-line operation, comprising a lifting platform, a four-axis platform and an end-effector mechanism, wherein the four-axis platform and the end-effector mechanism are both electrically conductive structures;

the four-axis platform is fixedly mounted on a top of the lifting platform, and an insulating layer is provided between the four-axis platform and the lifting platform; the four-axis platform is movable in an X direction, a Y direction, and a Z direction, and is rotatable around the Z direction; the four-axis platform is provided with an equipotential mechanism capable of establishing an equipotential relationship with a high-voltage bus;

the end-effector mechanism is detachably fastened to the four-axis platform; the end-effector mechanism comprises an inverted "L"-shaped integrated frame, and damping wheels capable of traveling on the high-voltage bus is connected to a top wall of the integrated frame; a left-direction guide rail mechanism and a right-direction guide rail mechanism are respectively provided on left and right sides of a side wall of the integrated frame, and the left-direction guide rail mechanism and the right-direction guide rail mechanism are movable in the X direction, the Y direction, and the Z direction; an electric wrench used for loosening or tightening a nut is connected to the left-direction guide rail mechanism, and a bolt fixing plate is connected to the right-direction guide rail mechanism; and a sub-line connection plate gripper used for clamping a branch line is provided on a bottom of the side wall of the integrated frame.

2. The apparatus for mounting the high-voltage line T-connector in the hot-line operation of claim 1, wherein the four-axis platform comprises first X-direction guide rail mechanisms, a first Y-direction guide rail mechanism, a first Z-direction guide rail mechanism and a first slewing mechanism; wherein the first X-direction guide rail mechanisms and the first Y-direction guide rail mechanism are both horizontally arranged; the first X-direction guide rail mechanisms are fixedly mounted on the top of the lifting platform, and an insulating layer is provided between the first X-direction guide rail mechanisms and the lifting platform; the first Y-direction guide rail mechanism is fixedly mounted on a top of the first X-direction guide rail mechanisms and is arranged perpendicular to the first X-direction guide rail mechanisms; the first Z-direction guide rail mechanism is vertically arranged and is arranged perpendicular to both the first X-direction guide rail mechanisms and the first Y-direction guide rail mechanism; a bottom of the first Z-direction guide rail mechanism is connected to a top of the first Y-direction guide rail mechanism by means of the first slewing mechanism; the equipotential mechanism is fixedly connected to the first Z-direction guide rail mechanism; and a hook used for fastening the end-effector mechanism is further provided on the first Z-direction guide rail mechanism.

3. The apparatus for mounting the high-voltage line T-connector in the hot-line operation of claim 2, wherein the first X-direction guide rail mechanisms, the first Y-direction guide rail mechanism and the first Z-direction guide rail mechanism have a same structure, and all comprise a base plate, linear guide rails, a mounting plate, a lead screw, a motor and a speed reducer; wherein the base plate and the mounting plate are arranged in parallel relative to each other; the lead screw is located on a central line in a length direction of the base plate; the two linear guide rails are respectively provided at two sides of the lead screw and are arranged in parallel with the lead screw; one end of the lead screw is connected to the motor and the speed reducer in a fitting manner; slide blocks are respectively provided at two ends of the mounting plate and are capable of freely sliding in the linear guide rails; an internal thread is provided on a middle portion of the mounting plate and is connected to the lead screw in the fitting manner;

the base plate of each first X-direction guide rail mechanism is fixedly mounted on the top of the lifting platform, and an insulating layer is provided between the base plate and the lifting platform; the base plate of the first Y-direction guide rail mechanism is fixedly connected to the mounting plate of each first X-direction guide rail mechanism; the mounting plate of the first Y-direction guide rail mechanism is connected to a lower end of the base plate of the first Z-direction guide rail mechanism by means of the first slewing mechanism; the equipotential mechanism is fixed on the base plate of the first Z-direction guide rail mechanism; and the hook is fixedly connected to the mounting plate of the first Z-direction guide rail mechanism.

4. The apparatus for mounting the high-voltage line T-connector in the hot-line operation of claim 3, wherein the equipotential mechanism comprises a transverse rod arranged horizontally, an inclined rod arranged obliquely and having a variable length, a pneumatic push rod arranged vertically, and a clamping claw mounted on a top of the pneumatic push rod; one end of the transverse rod, an upper end of the inclined rod, and a lower end of the pneumatic push rod are hinged together; and the other end of the transverse rod and a lower end of the inclined rod are respectively hinged to the base plate of the first Z-direction guide rail mechanism.

5. The apparatus for mounting a-the high-voltage line T-connector in the hot-line operation of claim 1, wherein the left-direction guide rail mechanism comprises a second X-direction guide rail mechanism, a second Y-direction guide rail mechanism and a second Z-direction guide rail mechanism; the right-direction guide rail mechanism comprises a third X-direction guide rail mechanism, a third Y-direction guide rail mechanism and a third Z-direction guide rail mechanism;

the second X-direction guide rail mechanism, the second Y-direction guide rail mechanism, the second Z-direction guide rail mechanism, the third X-direction guide rail mechanism, the third Y-direction guide rail mechanism and the third Z-direction guide rail mechanism have a same structure, and all comprise a base plate, linear guide rails, a mounting plate, a lead screw, a motor and a speed reducer; wherein the base plate and the mounting plate are arranged in parallel relative to each other; the lead screw is located on a central line in a length direction of the base plate; the two linear guide rails are respectively provided at two sides of the lead screw and are arranged in parallel with the lead screw; one end of the lead screw is connected to the motor and the speed reducer in a fitting manner; slide blocks are respectively provided at two ends of the mounting plate and are capable of freely sliding in the linear guide rails; an internal thread is provided on a middle portion of the mounting plate and is connected to the lead screw in the fitting manner;

the base plate of the second Y-direction guide rail mechanism is fixed on the side wall of the integrated frame; the base plate of the second Z-direction guide rail mechanism is fixedly connected to the mounting plate of the second Y-direction guide rail mechanism; the mounting plate of the second Z-direction guide rail mechanism is fixedly connected to one end of the base plate of the second X-direction guide rail mechanism; the electric wrench is mounted on the mounting plate of the second X-direction guide rail mechanism;

the base plate of the third Y-direction guide rail mechanism is fixed on the side wall of the integrated frame; the base plate of the third Z-direction guide rail mechanism is fixedly connected to the mounting plate of the third Y-direction guide rail mechanism; the mounting plate of the third Z-direction guide rail mechanism is fixedly connected to one end of the base plate of the third X-direction guide rail mechanism; and the bolt fixing plate is mounted on the mounting plate of the third X-direction guide rail mechanism.

6. The apparatus for mounting the high-voltage line T-connector in the hot-line operation of claim 5, wherein a second slewing mechanism is connected between the bolt fixing plate and the mounting plate of the third X-direction guide rail mechanism.

7. The apparatus for mounting the high-voltage line T-connector in the hot-line operation of claim 1, wherein a nut box used for placing the nut is further provided on the side wall of the integrated frame.

\* \* \* \* \*